(12) United States Patent
Weidmer

(10) Patent No.: US 7,165,430 B2
(45) Date of Patent: Jan. 23, 2007

(54) METHOD AND APPARATUS FOR PATTERNING OF BORE SURFACES

(75) Inventor: Stan C. Weidmer, Cincinnati, OH (US)

(73) Assignee: Makino, Inc., Mason, OH (US)

( * ) Notice: Subject to any disclaimer, the term of this patent is extended or adjusted under 35 U.S.C. 154(b) by 0 days.

(21) Appl. No.: 11/071,873

(22) Filed: Mar. 3, 2005

(65) Prior Publication Data

US 2005/0217336 A1    Oct. 6, 2005

Related U.S. Application Data

(60) Provisional application No. 60/644,732, filed on Jan. 18, 2005, provisional application No. 60/549,583, filed on Mar. 3, 2004.

(51) Int. Cl.
*B21B 27/00* (2006.01)
*B21D 15/00* (2006.01)

(52) U.S. Cl. .............................. 72/102; 72/120; 72/112

(58) Field of Classification Search .................. 72/102, 72/112, 115, 117, 118, 119, 120, 126, 703; 29/90.01
See application file for complete search history.

(56) References Cited

U.S. PATENT DOCUMENTS

| | | | |
|---|---|---|---|
| 625,726 A | 5/1899 | Halifax | |
| 1,017,569 A | 2/1912 | Lewis, Sr. | |
| 1,594,114 A | 7/1926 | Prout | |
| 1,597,212 A | 8/1926 | Spengler | |
| 1,847,794 A | 3/1932 | Takeda | |
| 2,085,976 A | 7/1937 | Heintz | |
| 2,364,434 A | 10/1944 | Surtees | |
| 2,414,931 A | 1/1947 | Colwell et al. | |
| 2,575,938 A | 11/1951 | Brenneke | |
| 2,600,800 A | * 6/1952 | Pace et al. | 29/90.01 |
| 2,618,182 A | 11/1952 | Teetor | |
| 2,825,250 A | 3/1958 | Anthony et al. | |
| 3,063,763 A | 11/1962 | Zubrisky | |
| 3,089,362 A | * 5/1963 | Hill | 72/120 |

(Continued)

FOREIGN PATENT DOCUMENTS

DE         1046445 B    12/1958

(Continued)

OTHER PUBLICATIONS

International Search Report, dated Jul. 22, 2005 for PCT Application No. PCT/US2005/006985.

(Continued)

*Primary Examiner*—Ed Tolan
(74) *Attorney, Agent, or Firm*—Frost Brown Todd LLC

(57) ABSTRACT

An apparatus comprises a rotating member having one or more rollers. The one or more rollers have a plurality of protuberances. The rollers may be advanced toward a surface during rotation of the rotating member, such as toward a bore surface. The protuberances are configured to make a pattern of discrete indentations in the surface upon engagement of the protuberances with the surface. The apparatus is particularly suited for creating oil-retention pockets in the surface of an engine cylinder and other uses. The apparatus may be used to create a pattern of oil-retention pockets or other pockets in a cylinder with varying pocket density in a single pass.

20 Claims, 7 Drawing Sheets

U.S. PATENT DOCUMENTS

| | | |
|---|---|---|
| 3,133,344 A | 5/1964 | Keasler |
| 3,343,390 A | 9/1967 | Spencer |
| 3,587,272 A | 6/1971 | Zmuda |
| 3,688,537 A | 9/1972 | Schneider |
| 3,735,615 A | 5/1973 | Shneider |
| 3,808,955 A | 5/1974 | Hamada et al. |
| 3,824,827 A | 7/1974 | Stockbridge et al. |
| 3,827,269 A | 8/1974 | Hoagland et al. |
| 3,961,104 A | 6/1976 | Tanner |
| 4,178,725 A | 12/1979 | Goloff |
| 4,706,417 A | 11/1987 | Gary |
| 4,706,483 A | 11/1987 | Perraudin |
| 4,785,648 A | 11/1988 | Budrean et al. |
| 5,287,621 A | 2/1994 | Usui |
| 5,325,695 A | 7/1994 | Seo et al. |
| 5,331,775 A | 7/1994 | Carmichael et al. |
| 5,441,439 A | 8/1995 | Grimm et al. |
| 5,540,526 A | 7/1996 | Hyatt et al. |
| 5,630,953 A | 5/1997 | Klink |
| 5,655,955 A | 8/1997 | Nagel et al. |
| 5,775,853 A | 7/1998 | Keefer et al. |
| 5,862,700 A | 1/1999 | Klein |
| 5,916,317 A | 6/1999 | Willoughby et al. |
| 5,931,038 A | 8/1999 | Higashi |
| 5,975,987 A | 11/1999 | Hoopman et al. |
| 6,253,724 B1 | 7/2001 | Han |
| 6,270,295 B1 | 8/2001 | Hyatt et al. |
| 6,295,854 B1 | 10/2001 | Stein et al. |
| 6,470,724 B1 | 10/2002 | Friese |
| 6,503,031 B1 | 1/2003 | Chaet et al. |
| 6,527,623 B1 | 3/2003 | Bowers |
| 2003/0177804 A1* | 9/2003 | Luthy ..................... 72/102 |

FOREIGN PATENT DOCUMENTS

| | | |
|---|---|---|
| EP | 1405689 A | 4/2004 |
| GB | 878281 A | 9/1961 |

OTHER PUBLICATIONS

Written Opinion, dated Jul. 22, 2005 for PCT Application No. PCT/US2005/006985.

* cited by examiner

METHOD AND APPARATUS FOR PATTERNING OF BORE SURFACES

PRIORITY

This application claims priority from the disclosure of U.S. Provisional Patent Application Ser. No. 60/549,583, entitled "Method and Apparatus for Patterning of Bore Surfaces," filed Mar. 3, 2004. This application also claims priority from the disclosure of U.S. Provisional Patent Application Ser. No. 60/644,732, entitled "Tool with Selectively-Biased Member," filed Jan. 18, 2005, which is incorporated by reference herein.

BACKGROUND OF THE INVENTION

The present invention relates generally to the formation of pockets in surfaces. More specifically, it is directed to the formation of discrete oil retention pockets in the walls of engine cylinders.

The diameter and surface finish of engine cylinder walls are important to engine operation, as such characteristics may affect friction between the cylinder and piston rings, ring wear, and blow-by. The process of manufacturing engine cylinders typically includes rough and finish boring operations, followed by rough and finish honing operations, followed by a brushing operation to remove surface protrusions. Conventionally, the honing operations, particularly the finish honing operations, are used to control the final cylinder diameter and surface finish. It is often desirable that, by the end of these steps, reservoirs will be in the cylinder wall to retain sufficient oil for piston-wall lubrication.

Cylinder honing is conventionally done by a rotary tool, which is axially reciprocated within the bore, producing a crosshatch pattern. The feed rate (feed per revolution) may affect the angle of the cross-hatching. This process may produce shear stress in the cylinder wall by tearing or cutting the metal, resulting in metal being pushed over the graphite particles in the cast iron. Plateau honing may remove these high points on the cylinder wall surface. When such plateau honing is done, there may be no "break-in" period during which the piston rings remove the high points during initial engine operation.

Engine blow-by may occur when the air/fuel mixture leaks past the piston rings, into the crankcase, possibly blowing the mixture into the air cleaner. Oil blow-by may occur when oil enters the combustion chamber past the piston rings, oftentimes ending up in the burnt exhaust. Oil blow-by can be a major emission problem. The conventional cylinder honing process may produce angled, relatively long and continuous grooves that span the thickness of the piston rings. This may allow oil to migrate or be pumped or pushed through the grooves past the rings into the combustion chamber, resulting in blow-by. The surface pattern produced by conventional honing processes may be fairly uniform throughout the axis and circumference of the cylinder. The continuity of the grooves produced by this process may increase the potential for blow-by, as oil or an air/fuel mixture has a continuous path from generally one end of a cylinder to the other.

To eliminate the presence of such continuous paths along cylinder walls, and thereby reduce the likelihood of blow-by, lasers have been used to form individual pockets in cylinder walls for the retention of oil. The microstructure produced by such lasers typically comprises pockets (either spiral or cup structures) that are created in the cylinder wall by a laser beam. Typically, a series of dots or dashes 25 to 60 microns deep and 40 microns wide are burned into the top third of the cylinder by the laser after the bore has been semi-finished. After laser machining, the cylinders are usually finish-honed to remove the buildup of any molten mass on each side of the groove around the pits and to finish the bore. The typical automotive cylinder production sequence using laser structuring is thus comprised of rough honing, semi-finish honing, laser structuring, and finish honing. The heat generated by the laser, however, may produce unwanted weakening and/or hardening of the area surrounding the pockets. This hardening may be destructive to piston rings. Other drawbacks of exposing metal to heat, such as that generated by a laser, are known in the art.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF EMBODIMENTS OF THE INVENTION

Figure 1:
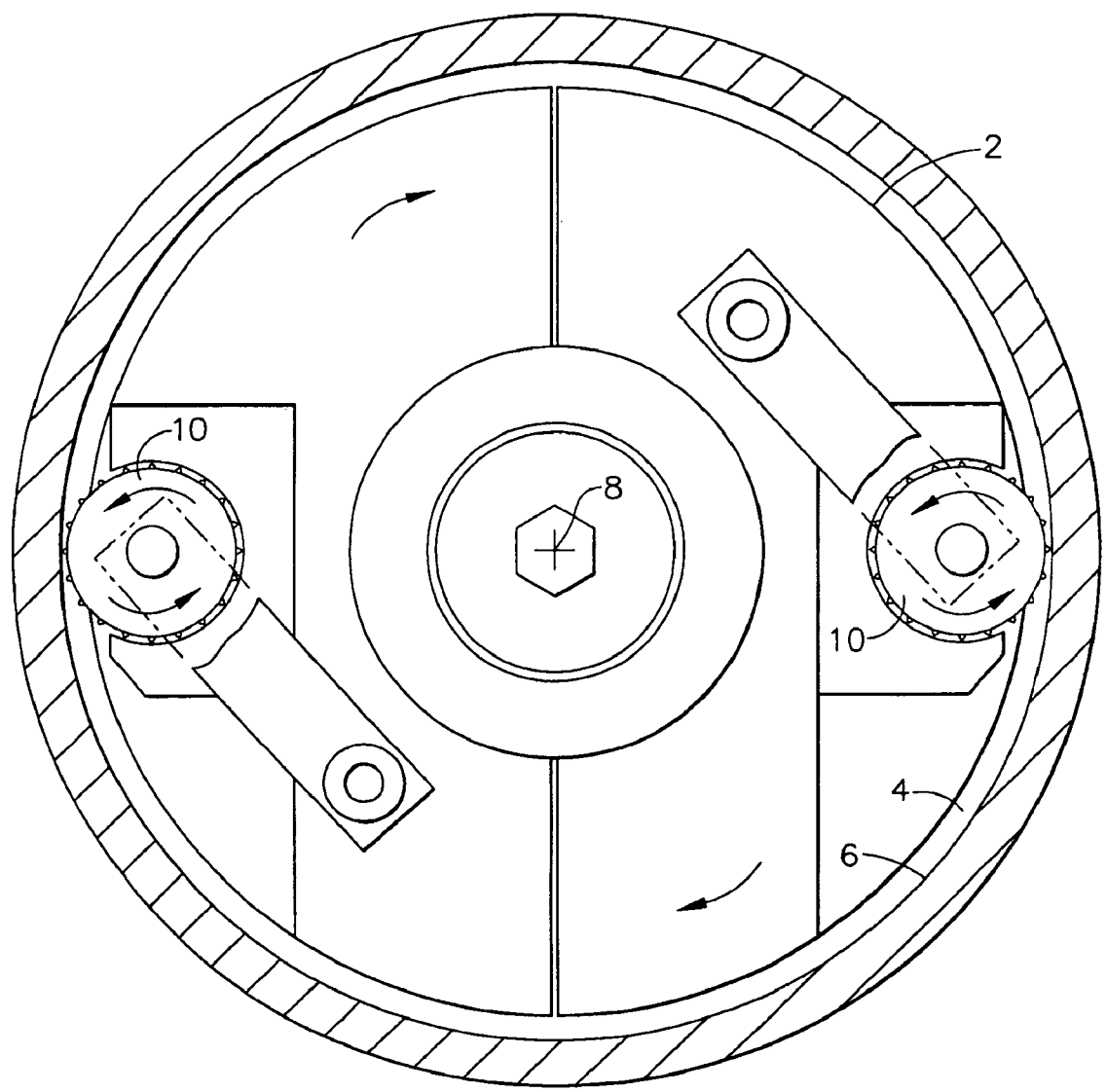
FIG. 1 depicts an end view of a tool constructed in accordance with the present invention, disposed within a cylinder.
Figure 2:
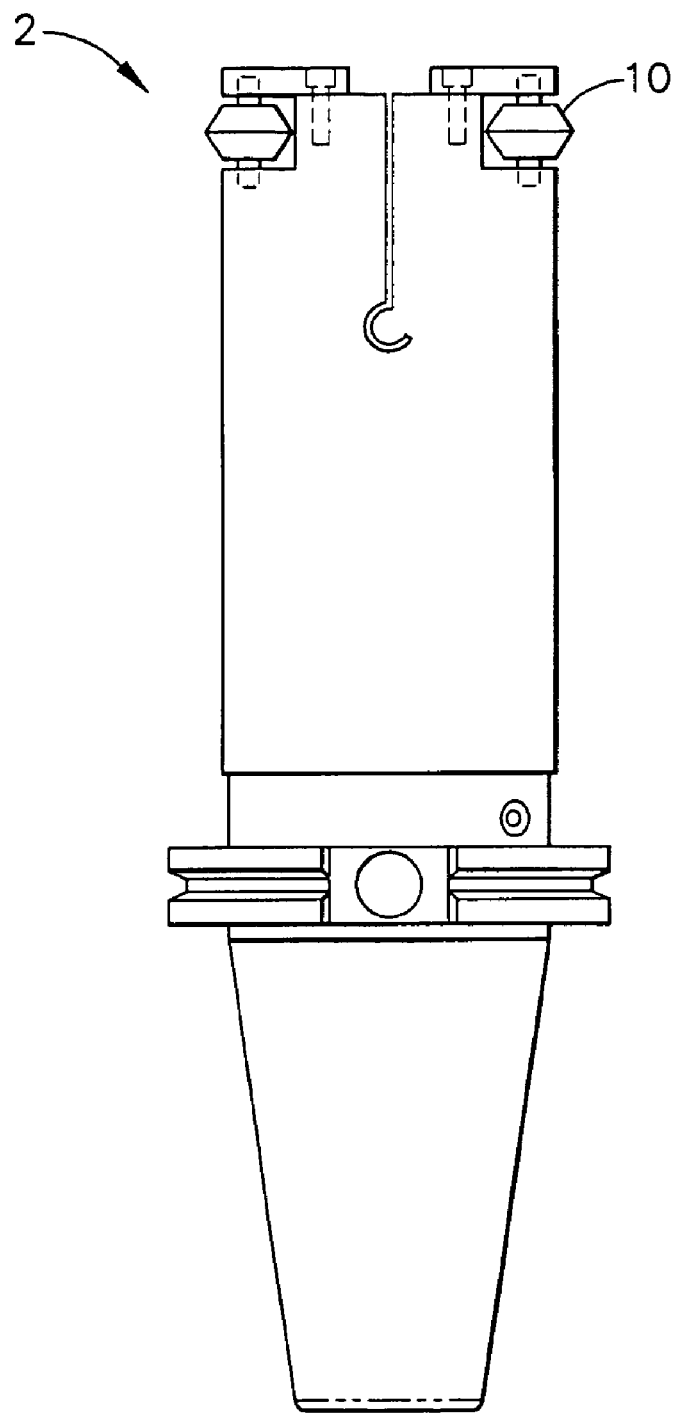
FIG. 2 depicts a side view of the tool of FIG. 1.
Figure 3:
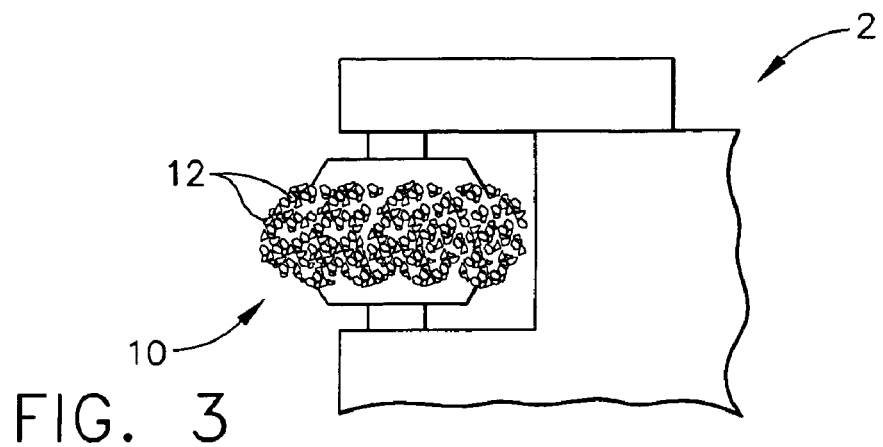
FIG. 3 depicts an enlarged, fragmentary cross-sectional side view of the tool of FIG. 1.
Figure 4:
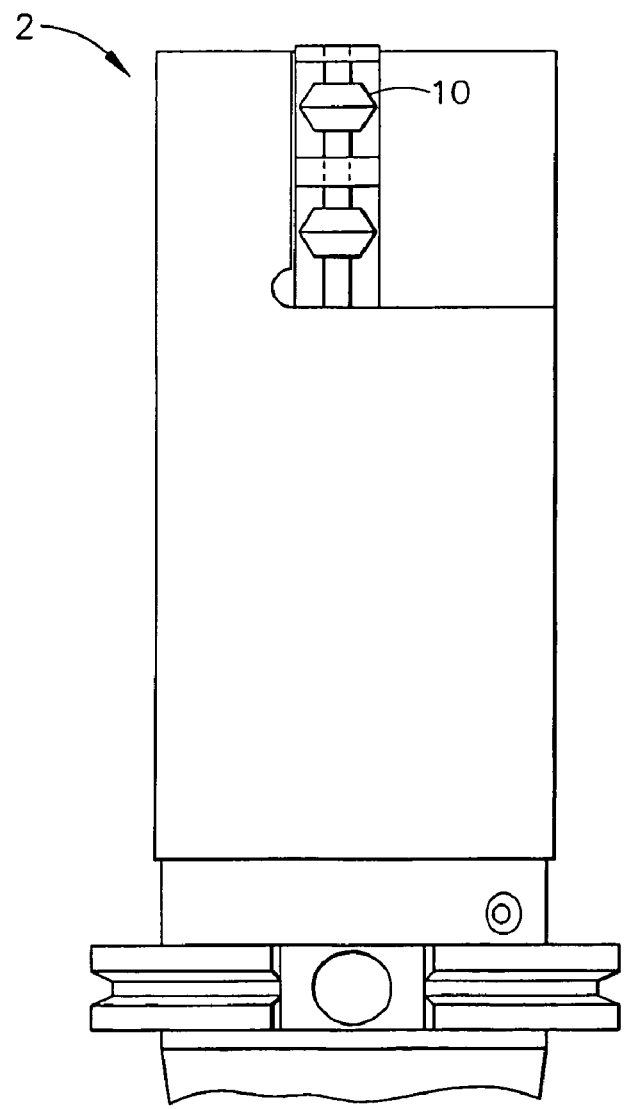
FIG. 4 depicts a side view of a tool constructed in accordance with the present invention.
Figure 5:
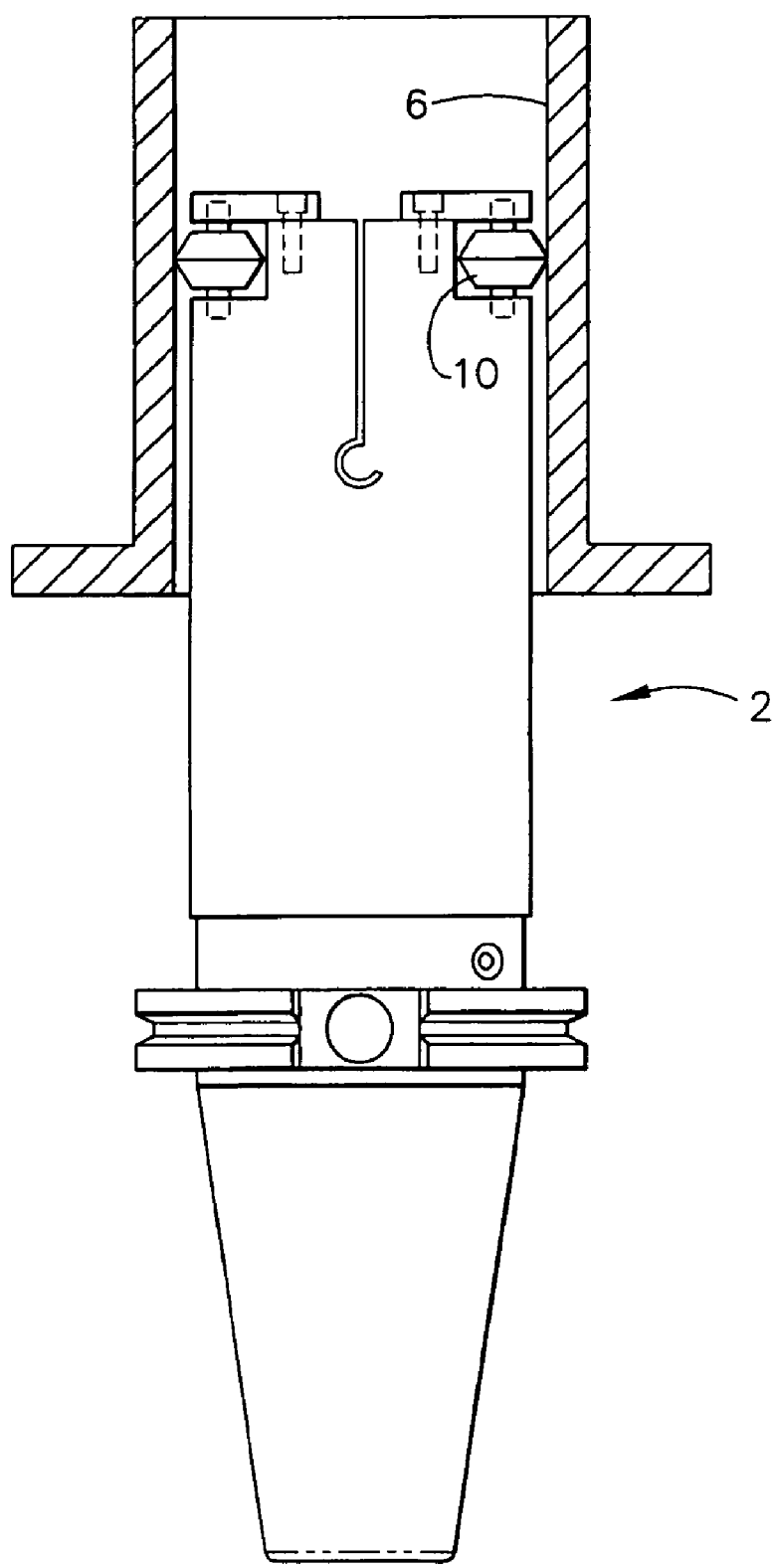
FIG. 5 depicts a side view of the tool of FIG. 1 in partial cross section, disposed within a cylinder.

Referring now to the drawings in detail, wherein like numerals indicate the same elements throughout the views, FIGS. 1–4 show tool 2 comprising a plurality of rollers 10 located proximate to its circumference. While two rollers 10 are shown in these figures, it will be appreciated that any number of rollers 10 may be used based on various considerations that will be apparent to those of ordinary skill in the art. Each roller 10 may have its own axis, or as shown in FIG. 4 by way of example only, a roller 20 may share an axis with another roller 10. Tool 2 is configured to rotate and advance axially into cylinder bore 4, and may be mounted to any suitable device or devices operable to accomplish such rotation and axial advancement. Tool axis 8, about which tool 2 rotates, may be aligned parallel to cylinder bore 4 axis when tool 2 is advanced into cylinder bore 4. Alternatively, tool axis 8 may have other appropriate orientation as will be apparent to those of ordinary skill in the art.

In the present example, rollers 10 are bearing-mounted to rotate freely, independent of tool 2 rotation. Alternatively, rollers 10 may be driven to rotate. By way of example only, rollers 10 may be mounted in or on tool 2 near the outer circumference of tool 2. Rollers 10 may be arranged about tool axis 8 such that the center of gravity of tool 2 with rollers 10 lies on tool axis 8. In part, such an arrangement may serve to balance tool 2. This may be accomplished by spacing rollers 10 equidistantly about a circumference of tool 2. Where only one roller 10 with protuberances is used, one or more carbide guide padded rollers lacking protuberances may be used to compliment such a roller, as those of ordinary skill in the art will appreciate. It will further be appreciated that one roller 10 may be used without a carbide guide padded roller to compliment it. It will also be understood that rollers 10 need not be arranged about tool axis 8 such that the center of gravity of tool 2 with rollers 10 lies on tool axis 8. Still other suitable configurations for rollers, or other suitable rotatable elements, will be apparent to those of ordinary skill in the art.

By way of example only, tool 2 may be used in conjunction with the apparatus disclosed in U.S. Pat. No. 6,270,295, which is incorporated herein by reference. Alternatively, tool 2 may be used in conjunction with the apparatus disclosed in U.S. Pat. No. 5,540,526, which is incorporated herein by reference. Alternatively, tool 2 may be used in conjunction with the apparatus disclosed in U.S. Pat. No. 5,775,853, which is incorporated herein by reference. Alternatively, tool 2 may be used in conjunction with the apparatus disclosed in U.S. patent application Ser. No. 10/654,328, filed Sep. 3, 2003, which is incorporated herein by reference.

While the present example describes the use of tool 2 in an engine cylinder bore 4, it will be appreciated that the contemplated use of tool 2 is not limited to such bores. Accordingly, tool 2 may be used in any suitable bore.

In the present example, tool 2 is operable to outwardly (e.g. radially) urge rollers 10 toward and into engagement with cylinder wall surface 6. This outward advancement may be accomplished by radial expansion of tool 2, such that parts of the circumference of tool 2 extend radially in addition to rollers 10 extending outwardly. Alternatively, the outward advancement of rollers 10 may be accomplished by radial extension of rollers 10 only, without radially expanding other parts of the circumference of tool 2. Accordingly, rollers 10 need not be initially mounted proximate to the circumference of tool 2 as shown. For example, rollers 10 may be recessed at any suitable depth within tool 2 prior to their advancement. Any other suitable method of accomplishing outward advancement of rollers 10 may be used. For example, rollers 10 may be outwardly advanced by springs, gears, hydraulics, centripetal force, or any other suitable means, method, and/or apparatus. In the present example, rollers 10 will rotate upon their engagement with cylinder wall surface 6 as a result of tool 2 rotation and friction between rollers 10 and cylinder wall surface 6.

Figure 6:
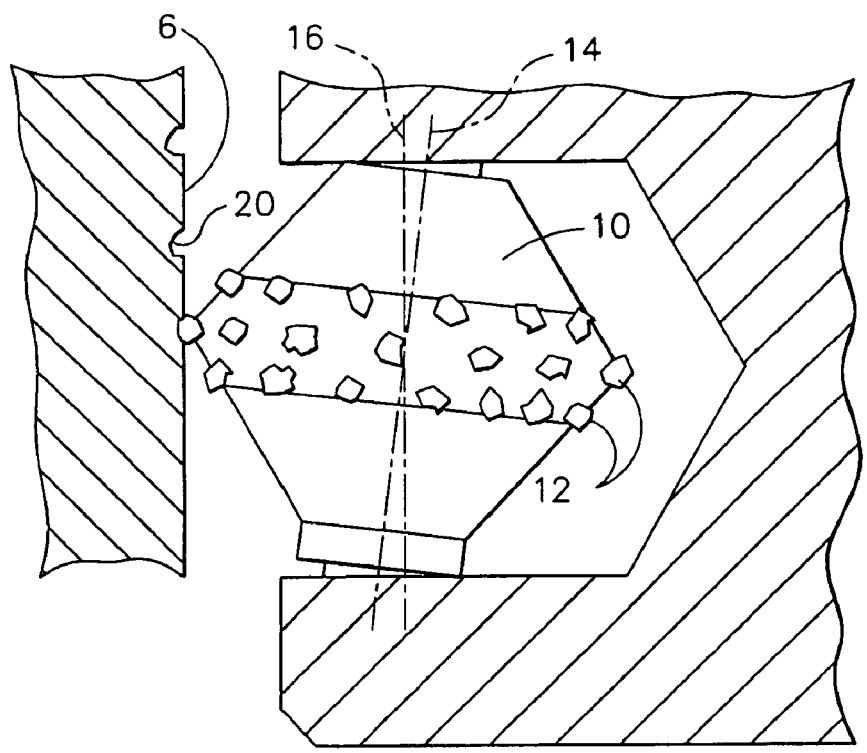
FIG. 6 depicts an enlarged, fragmentary side view of a roller of the tool of FIG. 1, engaged with a cylinder wall.

FIGS. 3 and 6 illustrate roller 10 with part of its outer surface coated with hard grit 12 substance. The part of the outer surface of roller 10 that is coated with grit 12 may generally be the part of roller 10 surface that would otherwise come in contact with cylinder wall surface 6. Grit 12 may be, by way of example only, diamond or cubic boron nitride (CBN), or any other suitable substance. Preferably, grit 12 will be a material of greater hardness than cast iron. Grit 12 may be held to the surface of roller 10 as a result of electroplating with nickel or any other suitable method known in the art. Alternatively, the outer surface of roller 10 may include a plurality of durable spikes or other protuberances. The number, spacing, size, density and/or type of grit or other protuberance may be varied based on a variety of considerations that will be apparent to those of ordinary skill in the art. Such considerations may include, by way of example only, the desired depth and/or density of pockets 20 to be created, and/or other considerations. In addition, rollers 10 need not be shaped like those shown in the figures. By way of example only, rollers 10 may be generally spherical, cylindrical, or any other suitable shape. In will also be appreciated that any other suitable rotatable element may be used.

In use, when tool 2 is disposed in cylinder bore 4 or other bore such that rollers 10 are proximate to cylinder wall surface 6, rollers 10 are urged into engagement with cylinder wall surface 6, causing grit 12 to form indentations or pockets 20 in cylinder wall surface 6 as tool 2 rotates with rollers 10 contacting cylinder wall surface 6.

FIG. 6 illustrates rollers 10 engaging cylinder wall surface 6, where reference axis 16 is parallel to tool axis 8. In the present example, tool axis 8 is parallel to the axis of cylinder bore 4, as is reference axis 16. As shown in FIG. 6, roller axis 14, about which roller 10 rotates, may be inclined at any orientation relative to reference axis 16. For example, an incline that is tangential relative to the circumference of tool 2 may be used to particularly align roller 10 for the rotating advancement of tool 2 into cylinder bore 4, as will be appreciated by those of ordinary skill in the art. Such inclined alignment may minimize any potential of shear along cylinder wall surface 6, and the preferable angle of incline may be a function of feed rate or other factors. Alternatively or additionally, roller axis 14 may be inclined parallel to a radius of tool 2. Such an incline may be used to selectively utilize the geometry of the surface of rollers 10. In addition, where the density of grit 12 on a roller 10 (e.g. grit 12 number per unit of roller 10 surface area) longitudinally varies, the incline of roller axis 14 may be adjusted such that a preferred density of grit 12 comes in contact with cylinder wall surface 6. Still other roller axis 14 orientations may be used based on a variety of considerations as will be apparent to those of ordinary skill in the art.

As tool 2 rotates, rollers 10 may rotate freely so that there is no sliding relative movement between the circumference of rollers 10 and cylinder wall surface 6 when in contact.

Figure 7:
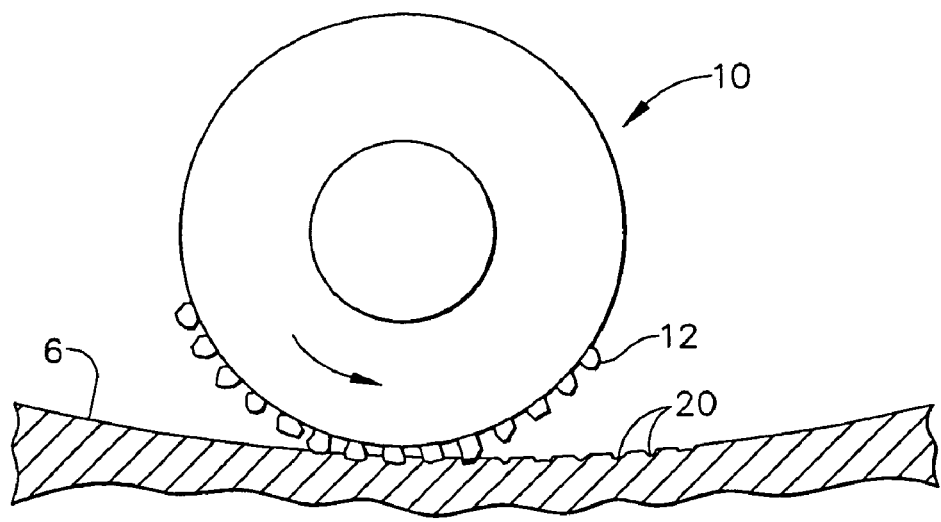
FIG. 7 depicts an enlarged, fragmentary end view in partial cross section of a roller of the tool of FIG. 1 engaging a surface.
Figure 8:
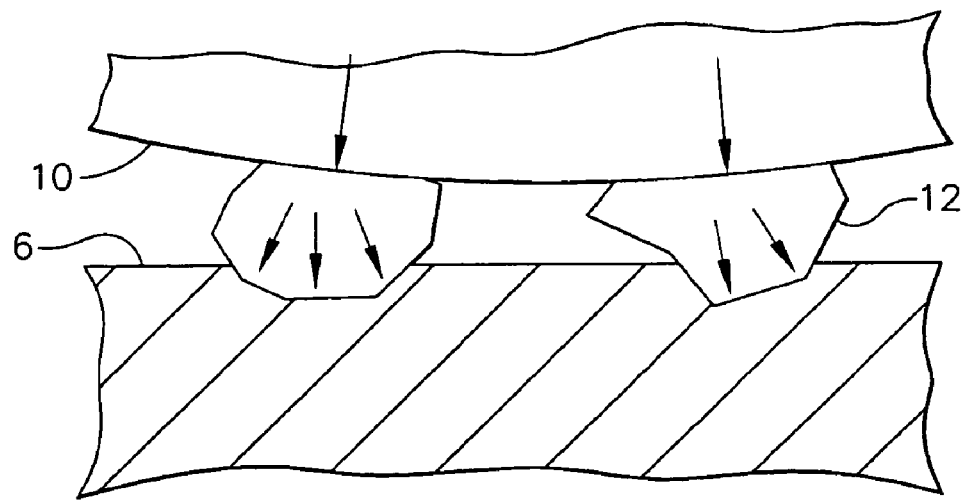
FIG. 8 depicts an enlarged, fragmentary end view in partial cross section of grit compressively engaging a surface.
Figure 9:
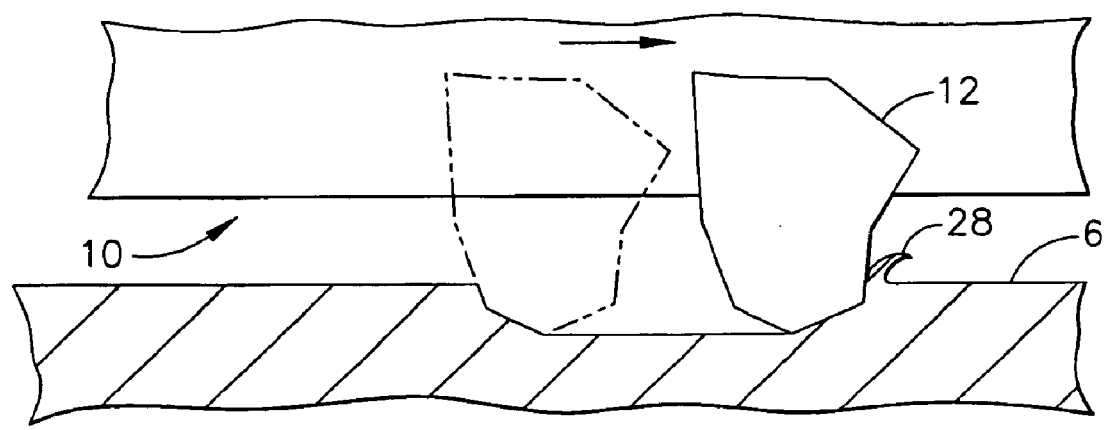
FIG. 9 depicts an enlarged, fragmentary side sequential view in partial cross section of a grit shearingly engaging a surface.

FIGS. 7 and 8 show the substantially perpendicular compression resulting from use of tool 2, in contrast to conventional tangential movement that produces the shearing shown in FIG. 9. In the present example, the forces exerted upon cylinder wall surface 6 by grit 12 are substantially radial or perpendicular to cylinder wall surface 6, as contrasted with substantially tangential forces exerted upon cylinder wall surface 6 that would occur with the shearing shown in FIG. 9. In other words, grit 12 does not slide along cylinder wall surface 6 in the present example. Thus, rollers 10 preferably serve to coin or stamp cylinder wall surface 6, such that material is not substantially torn, folded, or otherwise upset on cylinder wall surface 6 contiguous to the pockets 20. Preferably, the action of tool 2 does not shear the material, but is similar to coining a surface in that discrete oil retention pockets 20 are compressively formed as grit 12 imprint. Use of tool 2 results in a plurality of discrete pockets 20 suitable for oil retention in cylinder wall surface 6.

As tool 2 may create pockets 20 without creating microburrs 28, subsequent honing and/or brushing of cylinder wall surface 6 may not be necessary. When tool 2 is used, there may be minimal stress on the cylinder bore 4, and the amount of graphite exposed may be maximized. As will be appreciated by those of ordinary skill in the art, exposed graphite may demonstrate that lubrication of a cylinder wall surface 6 will be improved, and that less smearing of material on cylinder wall surface 6 has occurred. Those of ordinary skill in the art will understand that such smearing of material, resulting from conventional tools and methods, may make the material weaker, increasing the undesirable probability of flakes of the material cycling through parts of the engine.

After tool 2 has been introduced into cylinder bore 4 while rotating, and rollers 10 have been radially urged into engagement with cylinder wall surface 6, tool 2 continues to rotate as tool 2 is axially advanced further into cylinder bore 4. When the desired length of cylinder bore 4 has been traversed by tool 2, rollers 10 may be radially retracted, thereby disengaging rollers 10 from cylinder wall surface 6, then tool 2 may be axially withdrawn from cylinder bore 4. Thus, pockets 20 may be formed with only one pass of tool 2 into cylinder bore 4. Additionally, pockets 20 may be formed without a roller 10 crossing a path that it or another a roller 10 has already traversed. In other words, pockets 20 may be formed without grit 12 on a roller 10 crossing a pattern of pockets 20 that it or grit 12 on another roller 10 has created. In another embodiment, rollers 10 may remain engaged with cylinder wall surface 6 while tool 2 is axially withdrawn from cylinder bore 4 while rotating. Alternatively, tool 2 may be axially reciprocated within cylinder bore 4 with rollers 10 extended.

The desired depth and/or volume of pockets 20 may vary based on a variety of considerations. The depth and/or volume of pockets 20 formed may be controlled by factors including but not limited to grit or other protuberance type, size, hardness, and/or density, and the amount of force applied to rollers 10 as they engage cylinder wall surface 6. Other pocket 20 depth and/or volume variables will be apparent to those of ordinary skill in the art.

The spacing or density of pockets 20 (e.g., number of pockets per unit of surface area) may also be controlled. Pocket 20 density may be controlled by variables including but not limited to grit or other protuberance type, spacing, and/or size, the linear speed of the axial advancement of tool 2 through cylinder bore 4, the rotational speed of tool 2 while rollers 10 are engaged with cylinder wall surface 6, the amount of force applied to rollers 10 as they engage cylinder wall surface 6, and the number of passes of tool 2 into and out of all or part of cylinder bore 4. Other pocket 20 density variables will be apparent to those of ordinary skill in the art.

Figure 10:
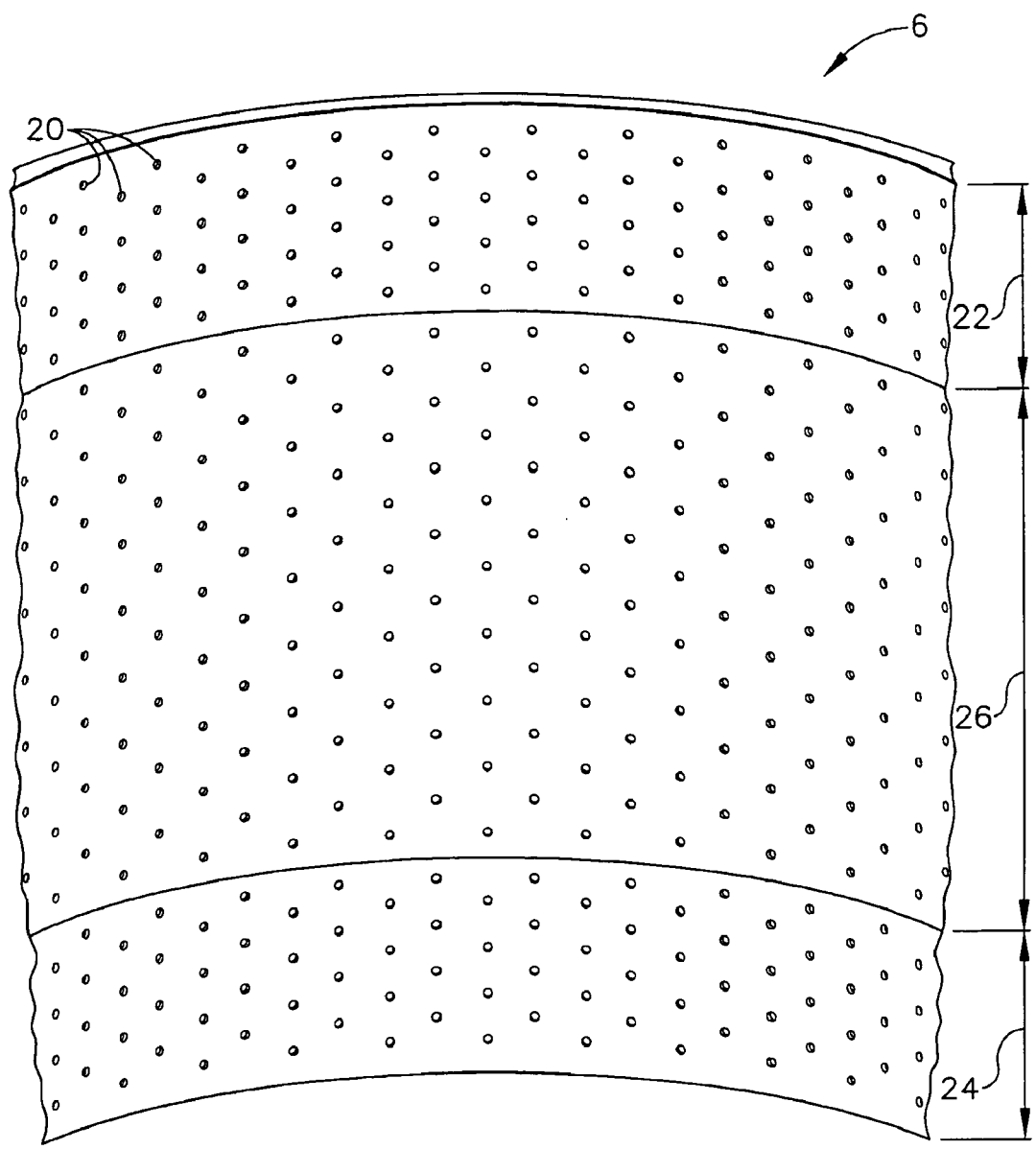
FIG. 10 depicts a cylinder wall with a pocket pattern.

Additionally, pocket density need not be uniform throughout the length of cylinder wall surface 6. By way of example, FIG. 10 represents a cylinder wall surface 6 in which the pocket 20 density is greater in areas at the top 22 and bottom 24 ends of the piston travel than the middle section 26 of the cylinder wall surface 6. Because many pocket 20 density variables may be controlled while tool 2 is in cylinder bore 4, such as, by way of example only, linear speed of the axial advancement of tool 2 through cylinder bore 4, the rotational speed of tool 2 while rollers 10 are engaged with cylinder wall surface 6, and the amount of force applied to rollers 10 as they engage cylinder wall surface 6, pocket 20 density may be varied while tool 2 is making a single pass into cylinder bore 4. Alternatively, pocket density may be varied in a plurality of passes of tool 2 in cylinder bore 4. Still other ways of varying pocket density will be apparent to those of ordinary skill in the art.

It will be appreciated that tool 2 may be fed into cylinder bore 4 at any suitable feed rate. By way of example only, tool 2 may be fed into cylinder bore at approximately 10 to 20 inches/minute. It will also be appreciated that, to the extent that the desired pattern has been created in a single pass into cylinder bore 4, tool 2 may be rapidly withdrawn, particularly when rollers 10 have been retracted.

It will also be appreciated that tool 2 may rotate at any suitable angular velocity. By way of example only, the angular velocity may be approximately 2,000 rpm.

As to the outward urging of rollers 10, tool 2 may accomplish the same by imparting, by way of example only, about 50 to 1,000 psi of pressure to rollers 10 or whatever suitable part of tool 2 is in mechanical communication with rollers 10. Where hydraulics are used, pressure used to outwardly urge and/or inwardly retract rollers 10 may be precisely controlled, as will be appreciated by those of ordinary skill in the art.

The following is a merely illustrative and not limiting example of how tool 2 may produce varying pocket 20 density in a single pass through a cylinder bore 4 that is 4 inches deep. Tool 2 rotates at 2,000 rpm as it is introduced to the cylinder bore 4. As soon as rollers 10 are at the desired location within cylinder bore 4, rotating tool 2 hydraulically urges rollers 10 into contact with cylinder wall surface 6 at 500 psi, such that grit 12 on rollers 10 forms pockets 20 in cylinder wall surface 6 as rollers 10 traverse the wall surface 6. While this engagement between grit 12 and cylinder wall surface 6 occurs, tool 2 is axially advanced into cylinder bore 4 at a feed rate of 10 in/min. When grit 12 on rollers 10 has created pockets 20 in cylinder wall surface 6 to a distance of 1 inch deep into cylinder bore 4, feed rate of tool 2 is increased to 20 in/min. Tool 2 continues to rotate at 2,000 rpm, and grit 12 continues to engage cylinder wall surface 6 at 500 psi. When grit 12 on rollers 10 has created pockets 20 in cylinder wall surface 6 to a distance of 3 inches deep into cylinder bore 4, feed rate of tool 2 is decreased back to 10 in/min. As rollers 10 traverse the final 1 inch of the depth of cylinder bore 4, tool 2 continues to rotate at 2,000 rpm, and grit 12 continues to engage cylinder wall surface 6 at 500 psi, the only change having been the feed rate of tool 2. When grit 12 on rollers 10 has reached the end of cylinder bore 4, rollers 10 are retracted radially with respect to axis of tool 2, such that grit 12 no longer engages with cylinder wall surface 6, and tool 2 is axially withdrawn from cylinder bore 4. The resulting pattern may be seen in FIG. 10, where top region 22 is the first 1 inch of cylinder bore 4, middle region 26 is the next 2 inches of cylinder bore 4, and bottom region 24 is last 1 inch of cylinder bore 4. In this example, the pattern of varying pocket 20 density is made in a single pass of tool 2 into cylinder bore 4.

In an alternate embodiment, instead of having rollers 10, tool 2 has one or more surface portions that may be extended radially outward with respect to the axis of tool 2. The one or more surface portions have grit 12 thereon or other protuberances extending therefrom. In this alternate embodiment, tool 2 may form a plurality of pockets 20 in cylinder wall surface 6 or any other surface by forcefully urging said surface portions radially toward said cylinder wall surface 6 or other surface, without tool 2 rotating during such urging. In this embodiment, tool 2 may act as a stamping apparatus, such that the grit 12 or other protuberances on extendable surface portions of tool 2 form pockets 20 in the surface against which said grit 12 or other protuberances are impinged by tool 2. In the context of a cylinder wall surface 6, by way of example only, to the extent that a single stamping action does not produce the desired amount of pockets 20, tool 2 may be partially rotated or otherwise re-positioned for a subsequent stamping, such that a subsequent stamping produces another set of pockets 20 in cylinder wall surface 6.

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. Obvious modifications or variations are possible in light of the above teachings. The one or more embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus for patterning a bore surface, the apparatus comprising:
    a rotating member having a diameter and one or more rotatable elements secured thereto, at least one of said one or more rotatable elements having a plurality of protuberances;
    wherein said rotating member is operable to expand the diameter and thereby advance the one or more rotatable elements from a first position toward the bore surface, wherein the protuberances are configured to form a plurality of indentations in the bore surface upon engagement of the protuberances with the bore surface.

2. The apparatus of claim 1, wherein the rotating member is generally cylindraceous, and wherein the rotating member has a generally circular distal end.

3. The apparatus of claim 2, wherein the one or more rotatable elements are disposed at the distal end of the rotating member.

4. The apparatus of claim 3, wherein the one or more rotatable elements are circumferentially spaced substantially equidistantly.

5. The apparatus of claim 1, wherein the rotating member has a tool axis, wherein the rotating member is configured to rotate about the tool axis, wherein each of the one or more rotatable elements has a roller axis, wherein each of the one or more rotatable elements is configured to rotate about a respective roller axis.

6. The apparatus of claim 5, wherein each of the one or more rotatable elements is configured to rotate freely about a respective roller axis.

7. The apparatus of claim 5, wherein each roller axis is inclined relative to a reference axis, wherein the reference axis is parallel to the tool axis.

8. The apparatus of claim 5, wherein the rotating member has a distal end with an outer perimeter, wherein each roller axis is positioned within the outer perimeter of the distal end.

9. The apparatus of claim 8, wherein the position of each roller axis relative to the outer perimeter is substantially fixed.

10. The apparatus of claim 1, wherein the protuberances comprise grit.

11. The apparatus of claim 10, wherein the grit comprises at least one of diamond or cubic boron nitride.

12. The apparatus of claim 1, wherein the rotating member is operable to controllably vary the spacing of indentations formed by the protuberances in the bore surface during a single pass into the bore.

13. The apparatus of claim 1, wherein said rotating member is operable to advance the one or more rotatable elements toward the bore surface using a pressurized medium.

14. The apparatus of claim 1, wherein the protuberances are configured to form a plurality of indentations in the bore surface by compressive engagement of the protuberances with the bore surface.

15. The apparatus of claim 1, wherein the rotating member has a tool axis, wherein the rotating member is operable to rotate about the tool axis, wherein the rotating member is operable to advance the one or more rotatable elements outwardly relative to the tool axis toward the bore surface.

16. A method for patterning a surface of a bore, the method comprising:
    (a) rotating a tool, wherein the tool comprises a member having one or more rollers, wherein at least one of the one or more rollers has a plurality of protuberances;
    (b) advancing at least a portion of the tool along the bore at a feed rate;
    (c) urging the one or more rollers toward the bore surface;
    (d) engaging the one or more rollers with the bore surface, wherein the protuberances are configured to form a pattern of indentations in the bore surface upon engagement of the protuberances with the bore surface, wherein the pattern comprises a plurality of discrete indentations; and
    (e) varying the feed rate of the tool while the one or more rollers are engaged with the bore surface to create a varied density of discrete indentations.

17. The method of claim 16, further comprising retracting the one or more rollers away from the bore surface.

18. The method of claim 16, further comprising controllably varying the spacing of indentations formed by the protuberances.

19. The method of claim 18, wherein the step of controllably varying the spacing of indentations is performed during a single pass of the tool into the bore.

20. An apparatus for patterning a bore surface, the apparatus comprising:
    a rotating member having a diameter and one or more rollers secured thereto, at least one of said one or more rollers having a plurality of protuberances, wherein the protuberances comprise grit;
    wherein said rotating member is operable to hydraulically expand the diameter and thereby advance the one or more rollers toward the bore surface, wherein said protuberances are configured to compressively form a plurality of indentations in the bore surface upon engagement of the protuberances with the bore surface.

* * * * *